US007618524B1

(12) United States Patent
Shepodd et al.

(10) Patent No.: US 7,618,524 B1
(45) Date of Patent: Nov. 17, 2009

(54) POLYMERIC SALT BRIDGES FOR CONDUCTING ELECTRIC CURRENT IN MICROFLUIDIC DEVICES

(75) Inventors: Timothy J. Shepodd, Livermore, CA (US); Mark S. Tichenor, San Diego, CA (US); Alexander Artau, Humacao, PR (US)

(73) Assignee: Sandia Corporation, Livermore, CA (US)

( * ) Notice: Subject to any disclaimer, the term of this patent is extended or adjusted under 35 U.S.C. 154(b) by 967 days.

(21) Appl. No.: 10/916,310

(22) Filed: Aug. 10, 2004

(51) Int. Cl.
*G01N 27/453* (2006.01)

(52) U.S. Cl. ....................................... 204/601; 204/600

(58) Field of Classification Search ......... 204/601–605, 204/450–455
See application file for complete search history.

(56) References Cited

U.S. PATENT DOCUMENTS

| | | | | |
|---|---|---|---|---|
| 4,908,112 | A | 3/1990 | Pace | |
| 4,997,537 | A * | 3/1991 | Karger et al. | 204/453 |
| 5,069,766 | A * | 12/1991 | Zhu et al. | 204/454 |
| 5,219,923 | A * | 6/1993 | Shorr | 524/827 |
| 5,246,577 | A * | 9/1993 | Fuchs et al. | 204/604 |
| 5,858,195 | A | 1/1999 | Ramsey | |
| 6,174,675 | B1 | 1/2001 | Chow et al. | |
| 6,238,538 | B1 | 5/2001 | Parce et al. | |
| 6,306,273 | B1 | 10/2001 | Wainright et al. | |
| 6,306,590 | B1 | 10/2001 | Mehta et al. | |
| 6,409,900 | B1 | 6/2002 | Parce et al. | |
| 6,413,782 | B1 | 7/2002 | Parce et al. | |
| 6,429,025 | B1 | 8/2002 | Parce et al. | |
| 6,432,290 | B1 | 8/2002 | Harrison et al. | |
| 6,479,299 | B1 | 11/2002 | Parce et al. | |
| 6,685,809 | B1 * | 2/2004 | Jacobson et al. | 204/450 |
| 6,782,746 | B1 | 8/2004 | Hasselbrink | |
| 6,952,962 | B2 | 10/2005 | Hasselbrink | |

(Continued)

OTHER PUBLICATIONS

Techzone article on electroendosmosis. Downloaded on Nov. 5, 2008 from www.fisherco.uk/phpfiles/techzone/question.php?questionid=14.*

(Continued)

*Primary Examiner*—Alex Noguerola
(74) *Attorney, Agent, or Firm*—R. Reams Goodloe, P.S.

(57) ABSTRACT

A "cast-in-place" monolithic microporous polymer salt bridge for conducting electrical current in microfluidic devices, and methods for manufacture thereof is disclosed. Polymeric salt bridges are formed in place in capillaries or microchannels. Formulations are prepared with monomer, suitable cross-linkers, solvent, and a thermal or radiation responsive initiator. The formulation is placed in a desired location and then suitable radiation such as UV light is used to polymerize the salt bridge within a desired structural location. Embodiments are provided wherein the polymeric salt bridges have sufficient porosity to allow ionic migration without bulk flow of solvents therethrough. The salt bridges form barriers that seal against fluid pressures in excess of 5000 pounds per square inch. The salt bridges can be formulated for carriage of suitable amperage at a desired voltage, and thus microfluidic devices using such salt bridges can be specifically constructed to meet selected analytical requirements.

6 Claims, 6 Drawing Sheets

U.S. PATENT DOCUMENTS

| | | | |
|---|---|---|---|
| 6,988,402 B2 | 1/2006 | Hasselbrink | |
| 7,052,608 B2 | 5/2006 | Shepodd | |
| 2001/0008212 A1 | 7/2001 | Shepodd et al. | |
| 2002/0194909 A1 | 12/2002 | Hasselbrink, Jr. et al. | |

OTHER PUBLICATIONS

D. J. Throckmorton; T. J. Shepodd; A. K. Singh; "Electrochromatography in Microchips: Reversed-Phase Separation of Peptides and Amino Acids Using Photopatterned Rigid Polymer Monoliths", Analytical Chemistry, 2002, 74, pp. 784-789.

E. F. Hasselbrink, Jr.; T. J. Shepodd; J. E. Rehm; "High-Pressure Microfluidic Control in Lab-on-a-Chip Devices Using Mobile Polymer Monoliths", Analytical Chemistry, 2002, 74, pp. 4913-4918.

E. C. Peters; M. Petro; F. Svec; J. M. J. Frechet; "Molded Rigid Polymer Monoliths as Separation Media for Capillary Electrochromatography", Analytical Chemistry, 1997, vol. 69, No. 17, pp. 3646-3649.

* cited by examiner

POLYMERIC SALT BRIDGES FOR CONDUCTING ELECTRIC CURRENT IN MICROFLUIDIC DEVICES

STATEMENT OF GOVERNMENT INTEREST

The United States Government has rights in this invention pursuant to Contract No. DE-AC04-94AL85000 between the United States Department of Energy and Lockheed Martin Corporation for the management and operation of Sandia National Laboratories.

FIELD OF THE INVENTION

The invention is directed generally to novel devices for enabling the flow of electricity in microfluidic systems. More particularly, the invention is directed to electrically conductive structures for use in microfluidic devices, and to methods for fabrication and in-situ formation of electrically conductive structures in microfluidic devices, wherein such electrically conductive structures have preselected electrical, chemical, and structural properties.

BACKGROUND OF THE INVENTION

Development of miniaturized microfluidic systems has resulted in the ever increasing use of microanalytical devices that are able to perform a multitude of chemical, physical, and/or electrical processes on a microscale. Applications for such devices include a wide variety of tasks requiring chemical, physical, or electrochemical analysis and testing, including analytical chemistry, biochemistry, medical testing and instrumentation, and industrial process control. In order to effectively use and control many such devices, there is a need for the conduction of electricity between various components, or between a fluid and a nearby component. It is important that a circuit be completed without an unnecessary increase in resistance. Thus one of the requirements for a suitable conductor in such microcircuits is that it provides a lower resistance than other components in a particular electrical circuit.

As generally described herein, the term "microfluidic" refers to a system or device having channels and chambers that may be fabricated on the micron or submicron scale, i.e., having at least one cross-sectional dimension in the range from about 0.1 μm to about 500 μm. Various methods for fabrication of devices having such characteristics are known to those of ordinary skill in the art and to whom this specification is addressed. However, the use of such devices wherein controlled electrokinetic transport is utilized for various functions has been described by Ramsey in U.S. Pat. No. 5,858,195, issued Jan. 12, 1999 and entitled APPARATUS AND METHOD FOR PERFORMING MICROFLUIDIC MANIPULATIONS FOR CHEMICAL ANALYSIS AND SYNTHESIS, the disclosure of which is incorporated herein in its entirety by this reference. The reader is referred thereto for additional background with respect to electrokinetic material transport. In any event, it should be noted that many heretofore known features incorporated into microfluidic devices may be fabricated using standard photolithographic, wet chemical etching, and bonding techniques. Some aspects of such techniques may also be used to assist in the manufacture and incorporation into such devices the polymer salt bridges described herein.

In microfluidic devices, to provide the function of a miniature chemical factory, the device needs a way to move fluids, such as via pressure from pumps, or by electroosmotic flow. When electrical potential is used, either for moving fluids or for analytical purposes, the device must be provided with components and structures for moving electrical current between desired locations. Metal electrodes are generally undesirable or impractical in microfluidic devices because of localized electrical field inhomogenities and possible electrochemical reactions. Thus, in microfluidic devices, it would be advantageous to provide electrically conductive but fluid flow resistive structures that can be easily installed at any desired location in or adjacent to a selected fluid transport or fluid containing microchannel. In order to provide such a device, it would be advantageous if such electrically conductive but fluid flow resistive devices could be integrally manufactured within the microfluidic channels themselves. Thus, the important advantages of a novel, cast-in-place, monolithic polymer salt bridge, with formulatable and selectable conductivity characteristics, as well as compatibility with a particular aqueous or organic solvent mixture, or with selected analytic reagents, can be readily appreciated.

SUMMARY OF THE INVENTION

The present invention is directed to monolithic electrically conductive polymer salt bridge structures and a method of manufacture thereof, and more generally, to microfluidic devices for controlling and regulating fluid flow via electrical current flow, that incorporate a novel monolithic electrically conductive polymer salt bridge structure therein. Such electrically conductive structures are particularly useful in microfluidic devices that include electroosmotic or electrophoretic flow techniques.

Polymeric salt bridges are provided which conduct electricity by way of migration of ions in solution. In general, it is advantageous for such polymeric structures to support an electrical current without interfering with the analytical procedures being performed by the microfluidic device. More generally, such polymers can be provided for both acidic and alkaline conditions, and thus can be provided where either cations or anions are utilized as the mobile charge. Further, in some embodiments, such polymers can be provided where mobile and/or fixed ions contribute to conductivity.

Microporous polymer salt bridges as disclosed herein allow such structures to be fabricated in a desired microchannel, by injection of solution into a specified region of a three dimensional microfluidic device structure (typically an insulator such as glass, coated silicon, or plastic) in an unpolymerized state, and by subsequent formation in place of the polymer structure by a polymerization step initiated via a suitable method such as a UV or thermal cure process. If desired, the solvents within the polymeric salt bridge structures can be exchanged by diffusion before or during operation of the microdevice. In one embodiment, such a microporous polymer salt bridge can be physically secured to a glass substrate to provide for resistance against high fluid pressure. Further, microporous polymer salt bridges can be built in a variety of compositions to vary strength, flexibility, and microporosity as suitable for a specific application. Both organic and inorganic polymer salt bridges can be provided. Long and flexible cross-linking components can provide soft and flexible polymers. Formulations using other highly cross-linked components can provide polymeric salt bridge structures with increased hardness. Formulations using yet other cross-linkers can provide an optimum compromise between strength and flexibility. Since the microporous polymeric salt bridges can be manufactured in-place within minutes, the microfluidic devices that employ them do not require additional expensive or complicated manufacturing or assembly.

BRIEF DESCRIPTION OF THE DRAWING

In order to enable the reader to attain a more complete appreciation of the invention, and of the novel features and the advantages thereof, attention is directed to the following detailed description when considered in connection with the accompanying drawing, wherein.

Figure 1:
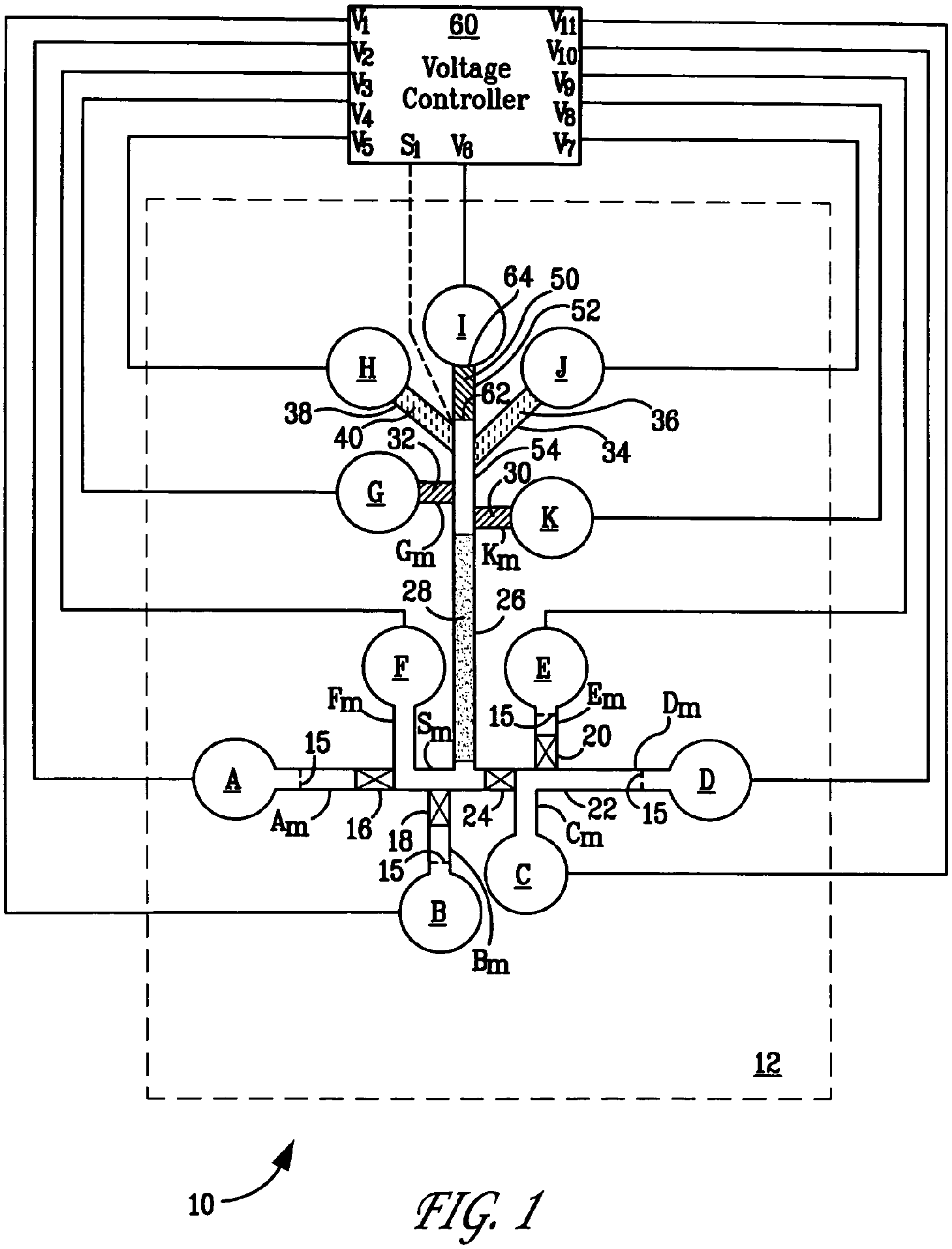
FIG. 1 shows a schematic illustration of one embodiment for a microfluidic device as described herein, which shows the use of a monolithic polymeric salt bridge as may be used in completing an electrical circuit in a microassay system.

The foregoing figures, being merely exemplary, point to various properties and particularly to electrical conductivity at selected applied voltages that may be present or omitted from actual implementations depending upon the circumstances. An attempt has been made to provide drawing figures in a way that illustrates at least those properties that are significant for an understanding of the various embodiments and aspects of the invention. However, various other properties, parameters, and physical or chemical characteristics may be utilized to provide various optional features as useful in order to provide an efficient, reliable, easily installed and low cost salt bridge for use in microfluidic devices.

DETAILED DESCRIPTION OF THE INVENTION

Many different embodiments for monolithic polymeric salt bridges have been developed that can be cast-in-place in a microchannel to provide electric current flow while preventing or minimizing fluid flow. The polymeric salt bridges of the invention are not restricted to any particular shape or geometry except by the configuration of the capillary or microchannel in which it functions and by the specific location where polymerization is initiated (normally via UV or thermal methods) for cure. The invention further includes a method for the manufacture of these polymer elements that provide for the polymer element to be cast-in-place. The polymeric salt bridge can also be secured to the microchannel walls by suitable pretreatment, thereby resisting extreme pressures which may be exerted by the analytical activities being conducted in the microfluidic device. Thus, the salt bridges can be confined within a microchannel and can be secured in place against the application of a displacing force via pressure or via an electric field. Generally, such salt bridges are located and affixed to the capillary or microchannel in which they are formed in a manner so that they can provide an effective seal against fluid flow at pressures up to the yield point of the polymeric matrix, which may typically be in the range from about 2000 pounds per square inch up to as much as about 6000 pounds per square inch, or more. Consequently, a microfluidic device is provided incorporating a polymeric salt bridge into a unitary structure that can be created in-situ on a substrate or microchip for preventing bulk fluid flows in capillaries or microchannels while allowing electricity to flow past such fixed salt bridge locations. The ability to easily complete an electrical circuit in microfluidic devices via use of polymeric salt bridges enables such devices to easily move electric current at a selected location without fluid flow.

In this written description, the terms channel and microchannel will be used interchangeably. Furthermore, the term "microfluidic" refers to a system or device having channels or chambers that are generally fabricated on the micron or submicron scale, e.g., having at least one cross-sectional dimension in the range from as small as about 0.1 μm to about 500 μm, i.e., microchannels. Also, it should be understood that a positively charged polymeric salt bridge is one wherein the polymeric structure has immobile positive ions, and mobile negative ions. A negatively charged polymeric salt bridge has negatively charged immobile ions, and mobile cations. A zwitterionic salt bridge uses a polymer having both mobile ions with positive charges and mobile ions with negative charges.

While the structure and function of the invention will be described and illustrated in relation to capillaries and microchannels and arrangements thereof, it is understood that the microchannels themselves are part of a microfluidic device. The microfluidic device can comprise channels, reservoir chambers, and shaped cavities that are fabricated using any of a number of microfabrication methods, including, but not limited to, injection molding, wet or dry etching, embossing, or deposition over a sacrificial layer. Such microfluidic devices can also include electrodes, holes and/or ports and/or connectors to adapt the microfluidic channels and reservoirs to external fluid handling devices and to external electrical connectors for voltage regulating or other devices.

FIG. 1 illustrates one embodiment for a microfluidic device 10 in which the polymeric salt bridges taught herein may be advantageously employed. A plurality of reservoir chambers A, B, C, D, E, F, G, H, I, J, and K are provided in the body 12 of the microfluidic device 10. Each reservoir chamber is in fluid communication with a corresponding microchannel $A_M$, $B_M$, $C_M$, $D_M$, $E_M$, $F_M$, $G_M$, $H_M$, $I_M$, $J_M$, and $K_M$, which are in turn fluidly connected to microchannel system $S_M$ in the microfluidic device 10. Valves 16, 18, and 20, and retaining means 15, similar to the structures disclosed and described in co-pending and commonly-owned U.S. patent application Ser. No. 10/141,906, herein incorporated by reference in its entirety, are provided to isolate chambers A, B, and E, respectively from lower microchannel 22. Valve 24 in lower microchannel 22 isolates chambers C, D, and E from microchannel 26, in which separation media 28 is provided. Flow restrictors 30 and 32 isolate chambers K and G, respectively, in a manner suitable for pinched injection. A first upper passageway 34 (same as $J_M$) includes an electrokinetic pump 36, and a second upper passageway 38 (same as $H_M$) includes a second electrokinetic pump 40. A salt bridge 50 is provided which is formed in place in microchannel 52 (same as $I_M$) between chamber I and the upper portion 54 of microchannel 26.

As illustrated, the polymeric salt bridge 50 is fabricated within the microchannel 52 and thus conforms to the shape of the microchannel. In such microfluidic devices 10, there may be hydraulic pressure, applied by pressure means such as an electrokinetic pump 36 or 40 which exerts high pressure against the salt bridge 50. This is often important, since in microfluidic systems it can be desirable to amplify fluid pressures for various purposes, such as separation in or through a selected media, or for actuation of a mechanical device. The electrokinetic pumps 36 and/or 40 may be actuated by a voltage controller 60 that has the capability to apply a selected electrical potential, i.e., applied voltage on circuit completion, between selected components, such as between chamber H and chambers F and I. As illustrated, such selected voltages may be at $V_1$, $V_2$, $V_3$, etc., through $V_{11}$, for example. And, it may be useful to provide one or more sensors $S_1$, etc., to detect voltage at a selected location in the microfluidic device 10, such as adjacent first end 62 of salt bridge 50, so that electrical potential across the salt bridge with respect to $V_6$ at second end 64 of salt bridge 60 at chamber I can be determined.

In a method of fabrication of monolithic polymeric salt bridges, a monomer is injected into a capillary or microchannel, and is then polymerized in-situ to produce a monolithic polymer material that conforms to the shape of the microchannel and bonds to surrounding structures, such as the microchannel walls. As taught herein, such salt bridges can be fabricated in a manner wherein they adhere to the microchannel walls, and thus are stationary even when subjected to extremes of applied pressure. In various embodiments, the monomer can be polymerized thermally, or by exposure to radiation. Convenient sources of radiation may include UV light, visible lamps, or lasers.

Depending on the application, it is normally desirable that the monolithic salt bridge polymer be microporous, but with pores sized to restrict fluid flow and a composition that allows ionic conduction. Generally, the salt bridge will allow electrical flow at greater than or equal to 10 times the adjacent fluidic channels or similar cross-section. And, fluid flow in salt bridges is in many embodiments at least a factor of 10 less than that in adjacent fluidic channels of equivalent cross-section. The degree of porosity is a property that is broadly defined by the formulation of the polymer which makes up the salt bridge. The term "porous" means that a pressure differential across the element results in some fluid flow through the element. In general, this means pores larger than about 10 nm, and more commonly a pore diameter in the range of from about 20 nm to about 100 nm. Useful but slightly porous monolithic electrically conductive salt bridge polymers may have a pore diameter substantially less than the selected cell size for the salt bridge. In some applications, a cell size of less than about 100 nm is preferable to prevent electroosmotic flow by double layer overlap. More generally, in the fabrication of a salt bridge a mechanically robust polymer is prepared with a selected porosity range (a) sufficiently large that it allows ionic current to flow through the polymer element, but (b) with porosity sized sufficiently small that bulk molecular flow (usually liquid) is negligible. In other words, in our monolithic polymeric salt bridges, the ions present must freely flow to support an electrical current, yet do so without interfering with the analytical procedures in the microfluidic device. To achieve such results, mobile and/or fixed ions can contribute to conductivity in a particular embodiment of a salt bridge. Also, to accommodate a wide variety of analytical operations in a microfluidic device, salt bridges can be constructed wherein operation can occur at both acidic or alkaline conditions, and wherein either cations or anions can function as the mobile charge.

The formulation of a monotholic polymeric salt bridge requires a monomer, a cross-linker, an initiator to begin the polymerization reaction, and a solvent to keep all of the molecules in solution until the polymer salt bridge has formed. The selected monomer and the selected solvent(s) drastically affect the physical and electrical characteristics of the resulting polymeric salt bridge. Pore size of the salt bridge is especially sensitive to changes in the mixture used for formulating a specific polymer salt bridge structure.

There are several basic requirements that must be fulfilled for successful fabrication of a stationary monolithic salt bridge polymer within a microchannel, as follows:

(1) the monomer mixture must flow readily within the selected microchannel;

(2) polymerization can be initiated utilizing a practical fabrication technique, such as thermally or by exposure to UV or laser light;

(3) the polymerized mixture may bond to the microchannel wall so as to resist movement when exposed to applied electrokinetic or hydraulic forces, irrespective of channel geometry, or the microchannel and the polymeric salt bridge may, for a selected length, comprise a configuration including engaged complementary shaped features which geometrically constrain the polymeric salt bridge against movement along the microchannel; and (4) the polymer salt bridge monolith must be sufficiently robust to remain substantially in the final size and shape when exposed to selected working solvents and extreme pressures.

The first requirement, flowability, can be fulfilled by the choice of solvent. The solvent not only acts to help mobilize the monomer mixture but also acts as a diluent controlling the rate of polymerization of the monomer and can assist in preventing polymerization not to extend substantially beyond the boundary of the radiation used to initiate polymerization. The second requirement, ease of polymerization, is aided by the addition of a UV or other light polymerization initiator to the mixture before delivery to the selected site for salt bridge installation. The third requirement, stability in and bonding to the microchannel, can be achieved by physically etching the capillary or microchannel. Also, in some cases, the use of a polymer having a surface charge opposite that of the surface of the microchannel substrate may be useful, as the attractive charges help hold the salt bridge in place. Also, monomers can be used which covalently bond directly to the glass surface, such as Dow-Corning Z-6030. Finally, with respect to physical stability of a polymeric salt bridge, since changes in solvent properties are unavoidable in many analysis and synthesis systems, polymer salt bridge monoliths must be designed to resist size and shape changes (i.e., expansion or contraction) upon solvent changes for a selected service in a microfluidic device. Such stability, when required, can be achieved through the use of a selected highly cross-linked polymer, which has the requisite mechanical strength yet retains sufficient flexibility to effectively provide a fluid seal at the selected location for the salt bridge in a capillary or microchannel.

The requirements set forth above are met in various ways in differing embodiments of the present invention. In one set of water soluble embodiments, selected monomers, cross-linkers, solvents and/or buffers, and initiators can be utilized, as further described below. In another set of organic soluble embodiments, selected monomers, cross-liners, solvents and/or buffers, and initiators can be utilized. Specific constituents, including chemical structure, chemical name, and a short-hand abbreviation or "nickname" for some of the important substances included in formulations utilized to fabricate monotholic salt bridges as taught herein are set forth in detail in TABLE 1. In TABLE 1 various monomers and cross-linkers which may be utilized for some embodiments of salt bridges of the type taught herein are shown, as well as certain solvents and initiators.

Mixtures for formulating polymeric salt bridges are designed to form a single phase liquid mixture at convenient temperatures, often in the range from about 15° C. to about 65° C. where solubility permits or slightly higher where solubility requires, and may include a monomer selected from the group [2-(methacryloyloxy)ethyl]trimethyl ammonium methyl sulfate ("MOE"); 2-Hydroxyethyl acrylate ("HEA"); 2-hydroxyethyl methacrylate ("2-HEMA"); sodium p-styrene sulfonate ("SSS"); 2-acrylamido-2-methyl-1-propane sulfonic acid ("AMPS"); N,N-Dimethyl-N-(2-methacryloyloxethyl)-N-3-sulfopropyl) ammonium betaine ("SPE"); methacrylonitrile ("MA"); vinyl phosphonic acid ("VPA"); acrylamide; and acrylonitrile, and selected mixtures of such components. In a typical mixture, the monomer is generally present at from about 5 percent to about 60 percent by volume of the monomer mixture. The monomer may be selected to carry a charge at a selected pH, or pH range, normally between about 2 and 12. For example, MOE provides a negative mobile ion charge ($CH_3SO_3^-$ or $Cl^-$), whereas SSS provides a positive mobile ion charge ($Na^+$). On the other hand, when SPE (a zwitterionic monomer) is used, the salt bridge remains conductive, but has the advantage that no mobile ions are released in solution except those provided by the solvent buffer.

A cross-linking agent selected from the group methylene bisacrylamide, its derivatives including N,N'-Methylenebisacrylamide, and N,N'-(1,2-dihydroxyethylene)bisacrylamide, and ethylene glycol diacrylate (also known by the abbreviation of "EDA"), di(ethylene glycol) diacrylate (also known by the abbreviation of "DEDA"), tetra (ethylene glycol) diacrylate) (also known by the abbreviation of "TEGDA"), and methacrylate equivalents of these acrylates, and ethoxylated (15) trymethylolpropane triacrylate (also known by the abbreviation of "SR-9035"), and mixtures of such cross-linkers. In a typical polymeric formulation, the cross-linking agent is generally present at from about 2 percent to about 30 percent by volume of the monomer mixture. An excellent crosslinker is di(ethylene glycol)diacrylate ("DEDA"), because polymers made using DEDA are durable structurally, as it balances strength and flexibility. Also, crosslinkers from the di(ethylene glycol) diacrylate family produce smaller pore sizes (due to the ethylene glycol links), and have good formulation solubility, which makes for ease of injection and cure. And, the use of tetra (ethylene glycol) diacrylate as a crosslinker usually provides a flexible, clear polymer.

A polymerization initiator, and in many embodiments, a photoinitiator such as sodium persulfate, ammonium persulfate, azobisisobutryronitrile, or 2-2A-azobis(2-methylpropanimidamide) dihydrochloride (a water soluble photoinitiator also known by the trade name V-50).

A solvent system, wherein aqueous solvent systems can comprise:

water (0-75 vol %);

additional co-solvents selected from C1-C3 alcohols, including ethanol and isopropyl alcohol; and buffer salts such as Tris(hydroxymethyl)aminomethane ("Tris"), typically at 5 mM solution; and wherein organic solvent systems can comprise:

a primary organic solvent such as acetonitrile;

additional co-solvents selected from (1) C1-C3 alcohols, including ethanol and isopropyl alcohol, or (2) 2-methoxyethanol.

buffer salts such Tris(hydroxymethyl)aminomethane ("Tris"), typically at 5 mM solution.

The following examples illustrate generally various methods for preparing polymeric salt bridges in capillaries and microchannels. Broadly, polymeric salt bridges may provide electrical current capacity in the range of from about 0.1 microamps to about 350 microamps when operated at a voltage potential ranging from about 1 volt to about 5000 volts. These examples only serve to illustrate various embodiments of the invention, and it is not intended that the invention be limited thereto. Importantly, modifications and variations may become apparent to those skilled in the art yet still fall within the scope of the appended claims and the equivalents thereof.

EXAMPLE 1

A positively charged salt bridge was prepared by using the following constituents:

| QTY | CONSTITUENT | WEIGHT % CONSTITUENT |
|---|---|---|
| 2.437 ml | Tris buffer, (pH 8, 5 mM) | 50.0 |
| 0.313 ml | MOE (acrylate monomer), 80% in water | 5.0 |
| 1.325 ml | HEA (acrylate monomer) | 26.5 |
| 0.8 ml | SR-9035 (cross-linker) | 16.0 |
| 0.125 g | MBA (cross-linker) | 2.5 |

A first monomer MOE and a second monomer HEA were combined with a first cross-linker SR-9035 and a second cross-linker MBA in a Tris buffer solution at pH 8. Then, 15 ml ammonium persulfate initiator was added and the mixture was injected into a microchannel and polymerized.

The formulation just described in this Example 1 can be altered to vary the charge concentration as needed by changing the amount of MOE, and adjusting the HEA to achieve a desired monomer/solvent ratio. Conductivity can also be increased by reducing the monomer concentration to as much as 40% of the total volume, which in one embodiment may be accomplished by reducing equal amounts of HEA and SR-9035. Also, when high compression strength is not needed, the formulation just shown in Example 1 can be varied to provide a less viscous monomer mixture by replacing the SR-9035 with HEA. Also, it should be noted that a similar formulation wherein SSS is utilized can be manufactured in order to provide a negatively charged salt bridge.

EXAMPLE 2

A negatively charged salt bridge can be prepared by using the following constituents:

| QTY | CONSTITUENT | WEIGHT % CONSTITUENT |
|---|---|---|
| 2.5 ml | Tris buffer, (pH 8, 5 mM) | 50.0 |
| 0.25 g | SSS (monomer), 80% in water | 5.0 |
| 1.325 ml | HEA (acrylate monomer) | 26.5 |
| 0.8 ml | SR-9035 (cross-linker) | 16.0 |
| 0.125 g | MBA (cross-linker) | 2.5 |

A first monomer SSS and a second monomer HEA were combined with a first cross-linker SR-9035 and a second cross-linker MBA in an aqueous Tris buffer solution. Then, 15 ml ammonium persulfate initiator was added and the mixture injected into a microchannel and polymerized, preferably by UV cure.

EXAMPLE 3

A salt bridge was prepared by providing mixture using the following constituents:

| QTY | CONSTITUENT | WEIGHT % CONSTITUENT |
|---|---|---|
| 3.0 ml | Tris buffer (pH 8, 5 mM) | 72.3 |
| 0.15 g | MBA (cross-linker) | 3.6 |
| 1.0 g | SPE (monomer) | 24.1 |

A first monomer SPE and a first crosslinker MBA were provided well mixed in an aqueous Tris buffer solution. Then, 8 ml of ammonium persulfate initiator was added and the mixture injected into a microchannel and polymerized by UV cure. The salt bridge provided by this formulation cures quickly. Also, this formulation is useful in some applications because it does not release any mobile ions into solution, and thus minimizes the impact of the salt bridge on other analytical procedures. However, the large buffer content and low monomer concentration and cross-link density results in provision of a bulk sample that is somewhat fragile in comparison to the salt bridges produced in Examples 1 and 2.

EXAMPLE 4

A salt bridge similar to that provided by Example 3 can be provided in a somewhat more conductive embodiment when prepared by providing a mixture using the following constituents:

| QTY | CONSTITUENT | WEIGHT % CONSTITUENT |
|---|---|---|
| 3.0 ml | Tris buffer (pH 8, 5 mM) | 69.3% |
| 0.15 g | MBA (cross-linker) | 3.4% |
| 1.0 g | SPE (monomer) | 22.7% |
| 0.250 ml | MOE (acrylate monomer) | 4.6% |

A first monomer SPE and a second monomer MOE are provided mixed with a first crosslinker MBA in an aqueous Tris buffer solution. Then, 8 ml of ammonium persulfate initiator was added and the mixture injected into a microchannel and polymerized by UV cure. The salt bridge provided by this formulation cures quickly and is more conductive than that provided by Example 3. Again, such a formulation is useful in some applications because it does not release any mobile ions into solution, and thus minimizes the impact of the salt bridge on analytical procedures conducted in the microfluidic device.

EXAMPLE 5

An acrylate-based salt bridge was prepared by using the following formulation (all quantities are percent by volume unless otherwise noted):

| QTY | CONSTITUENT | WEIGHT % CONSTITUENT |
|---|---|---|
| 2.437 ml | SPE (monomer, 40% solution in water) | 92.6 |
| 0.313 ml | MBA (cross-linker) | 3.7 |
| 1.325 ml | 2-methoxyethanol (co-solvent) | 1.9 |
| 0.8 ml | Phosphate buffer (pH 5.5, 10 mM) | 1.9 |

A first monomer SPE and a cross-linker MBA (in this case the N,N'-Methylenebisacrylamide derivative) were provided in aqueous solution with a co-solvent and a phosphate buffer. Then, an initiator (azobisisobutronitrile) was added at 0.5% by weight with respect to the SPE concentration. The MBA has limited solubility in water, and consequently, it was found convenient to dissolve the MBA in the aqueous SPE solution by alternating vortexing with the application of heat in a hot water bath at about 80° C. UV cure (365 nm wavelength, at 14 J/cm$^2$ or more) of the just described formulation provides a clear, hard solid salt bridge. Scanning electron microscopy revealed a pore size for the polymeric salt bridge in the nanometer range.

The just described acrylate based salt bridge is readily cast in cylindrical fused silica capillary tubes (100 μm inner diameter) and in microchannels (25 μm deep, 50 μm wide). Adhesion to capillary tube and/or microchannel walls can be achieved in one embodiment by pretreating the microchannel surfaces with a mixture of 50% $H_2O$, 30% glacial acetic acid, 20% N-[3-(trimethoxysilyl)propyl]-N'-(4-vinylbenzyl)ethylenediamine hydrochloride (40 weight percent in methanol) solution overnight. Such pretreatment is not effective if the hydrochloride salt just described is replaced with z-6030.

Desired photo patterning of the salt bridge is readily achieved by irradiating with a 2 mW laser operating at a wavelength of about 355 nm, to form a solid polymer element. By using an appropriate photomask, patterning can be achieved with better than 25 μm resolution. Also, it is normally advantageous that photopatterning be performed in an expeditious manner, since the reagent mixture described in this Example 5 will thermally polymerize in non-irradiated microchannels in a brief period of time, often in about 10 minutes at room temperature. The polymerization time can vary depending upon the intensity and wavelength of the radiation source, as known to those of ordinary skill in the art and to whom this specification is addressed. The selected initiator should absorb the radiation selected for the polymerization step. After formation of the solid salt bridge, any remaining unreacted monomer can be removed by flushing the capillary with a suitable solvent.

The just described salt bridge will handle currents in the 0.1 μA range at a field of 200 V/cm$^2$ (in a 100 μm inside diameter glass capillary). Also, this embodiment of an acrylate based salt bridge has been observed to resist bulk solvent flow upon application of pressures on the order of 1,900 pounds per square inch.

Using the fabrication method set forth above, it has been found possible to make polymeric salt bridges in-situ in extremely small capillaries (down to at least as small as 100 μm inner diameter) and microchannels (down to at least the range of 25 μm deep and 50 μm wide). As microfluidic handling techniques are further perfected, using the method described above, polymeric salt bridges even smaller in size may be possible.

Figure 2:
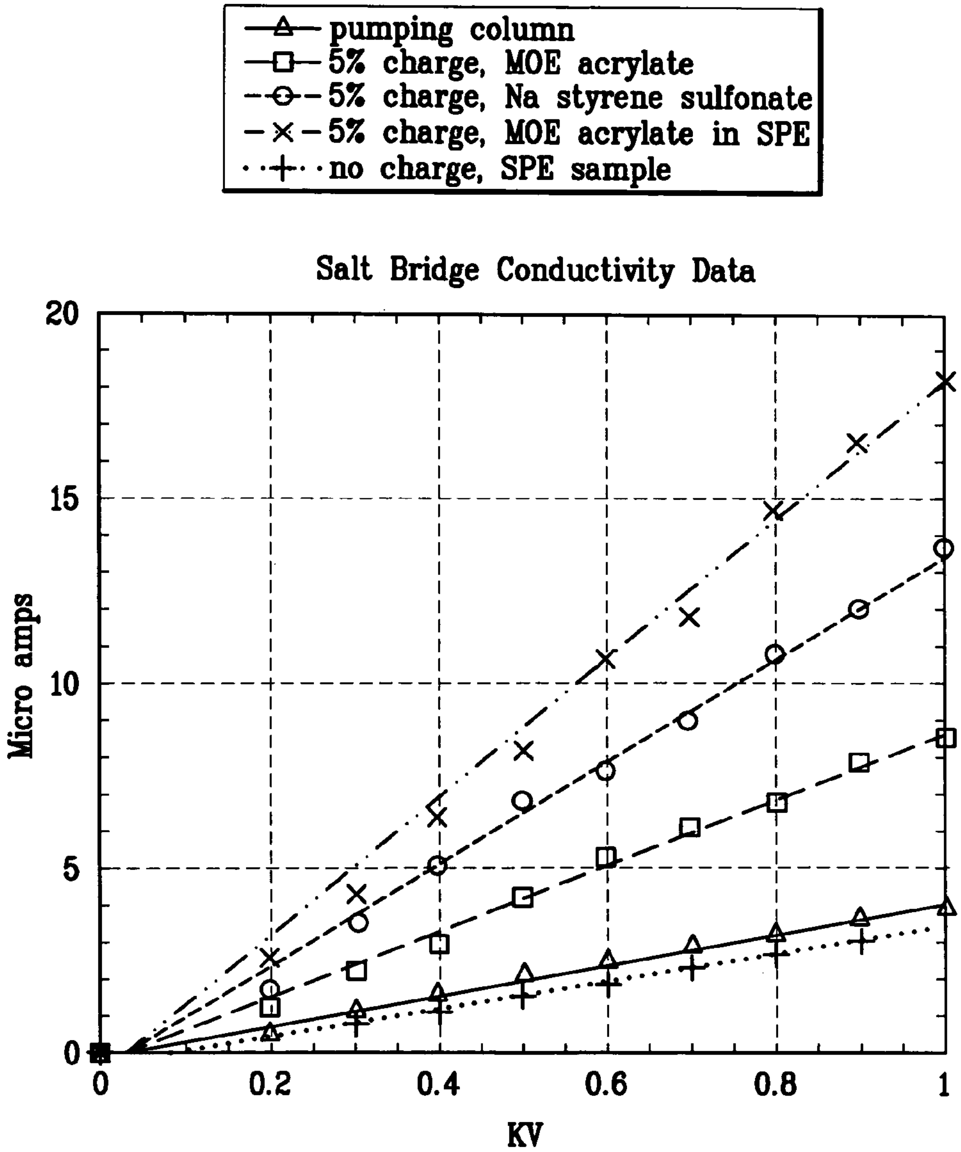
FIG. 2 shows conductivity data as a function of applied voltage for selected salt bridges fabricated as taught herein, and wherein the microamps of conductivity is shown as a function of applied voltage for three different types of polymers, namely (a) a [2-(Methacryloyloxy)ethyl]trimethyl ammonium methyl sulfate acrylate (also known by the abbreviation "MOE" acrylate) based polymer, (b) a sodium p-styrene sulfonate (also known by the abbreviation "SSS") based polymer, and (c) the use of MOE in N,N-Dimethyl-N-(2-methacryloyloxyethyl)-N-(3-sulfopropyl) ammonium betaine (which is also known by the abbreviation "SPE") based polymer.

The utility of salt bridges manufactured as described herein can be more fully appreciated by a careful examination of FIGS. 2 through 6. First, FIG. 2 shows conductivity data as a function of applied voltage for selected salt bridges manufactured using various monomers in a 5 mM Tris buffer solvent solution at pH 8, generally as taught herein. Conductivity was tested by placing an electrode at each end of a capillary in a 0.1 M phosphate buffer solution. First, one curve shows conductivity as a function of applied voltage is shown for a simple pumped capillary column without a salt bridge present. Then, the conductivity as a function of applied voltage is shown where an SPE polymer was provided with no charge. Slightly more conductivity is shown by the curve representing a MOE based polymer having a 5% charge. Even more conductivity was displayed by an SSS based polymeric salt bridge having a 5% charge. More conductivity yet was shown by a polymer using both MOE and SPE as two different monomers in a final polymer formulation. Clearly it can be seen in even this limited sample that a microfluidic device can be manufactured wherein the salt bridge can be utilized to provide a necessary amperage range at a selected applied voltage.

Figure 3:
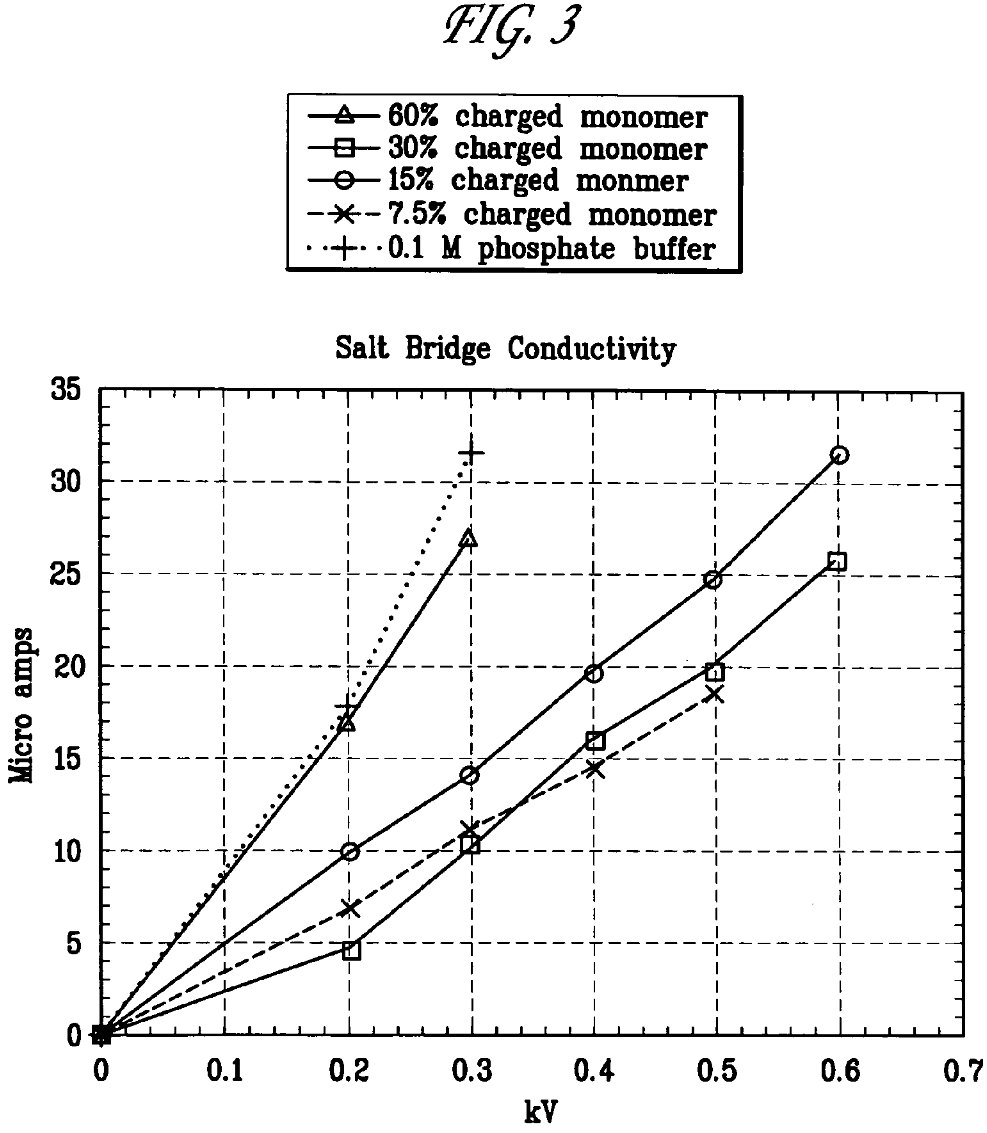
FIG. 3 shows conductivity data as a function of applied voltage for selected salt bridges fabricated as taught herein using as the charged monomer MOE formulated using an acetonitrile/ethanol/phosphate buffer solution at a 7:2:1 ratio and using a reaction initiated using AIBN and thermally cured, wherein various percentages of charged monomer in different embodiments are provided as shown for a selected polymeric salt bridge, as well as for comparison purposes the conductivity of a 0.1 M phosphate buffer solution based on measurement using electrodes on ends of a capillary containing the buffer solution.

For the various polymeric salt bridge formulations described by the conductivity curves depicted in FIG. 3, manufacture was accomplished by injection of the mixed monomer and solvent formulation into a 180 mm capillary, with polymerization in place by means of heat treatment. The polymerization reaction was initiated using AIBN. Each capillary was standardized to 12 cm in length. For testing, the ends of the capillary were placed in a 0.1 M phosphate buffer solution, with voltage potential supplied between electrodes to generate electrical current. Interestingly, the conductivities of the polymers were rather similar to that of a 0.1 M phosphate buffer solution. Each of the polymer formulations whose conductivity is depicted in FIG. 3 was manufactured utilizing MOE ([2-(Methacryloyloxy)ethyl]trimethyl ammonium methyl sulfate acrylate) as the monomer. One curve shows conductivity of a polymer formulated using 60% charged monomer. Another curve shows conductivity of a polymer formulated using a 30% charged monomer. Yet another curve shows conductivity of a polymer formulated using a 15% charged monomer. Finally, a curve is provided showing conductivity as a function of applied voltage for a polymer formulated using a 7.5% charged monomer.

Figure 4:
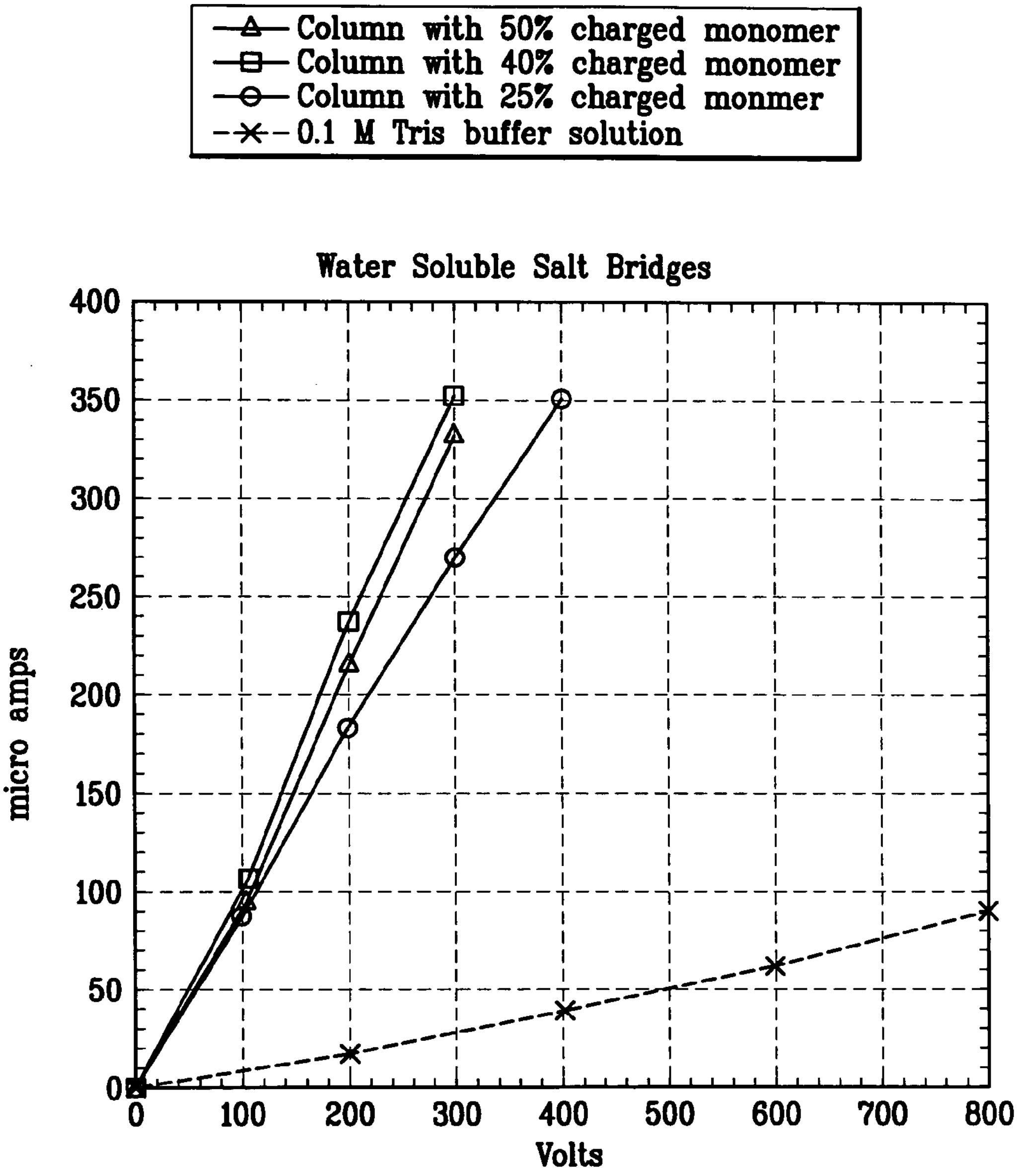
FIG. 4 shows conductivity data as a function of applied voltage for selected water soluble polymeric salt bridges, fabricated as taught herein using as the charged monomer 2-Acrylamido-2-methyl-1-propanesulfonic acid (also known by the abbreviation of "AMPS") formulated using a 5 mM Tris buffer solution as the solvent, and methylene bisacrylamide (also known by the abbreviation of "MBA") as the crosslinking agent, and using a reaction initiated with sodium persulfate, wherein various percentages of charged monomer in different embodiments are provided as shown for a selected polymeric salt bridge, as well as for comparison purposes the conductivity of a 0.1 M Tris(hydroxymethyl)aminomethane (also known by the abbreviation "Tris") buffer solution based on measurement using electrodes on ends of a capillary containing the buffer solution.

Turning now to FIG. 4, conductivities as a function of applied voltage is depicted for a number of water soluble salt bridge embodiments which were formulated utilizing a 5 mM Tris buffer as the solvent, and wherein AMPS (2-Acrylamido-2mthyl-1-propane sulfonic acid) was used as the monomer, and wherein MBA (methylene bisacrylamide) was utilized as the cross-linking agent. For testing purposes, as was done in the case of the organic salt bridges whose conductivity was described in FIG. 3, the polymer mixtures whose conductivity is shown in FIG. 4 were also injected into a 12 cm long, 180 mm capillary, and then polymerized using in this case a sodium persulfate initiator. Conductivity was also tested in like fashion. For comparison purposes, in FIG. 4 the conductivity of a 0.1 M Tris buffer solution is depicted. A 0.1 M Tris buffer solution has a resistance of approximately 1.0 M ohm/cm in a 180 mm capillary, whereas the more conductive polymeric salt bridges described herein have a resistance of only 65 k ohms/cm. In FIG. 4, one curve shows conductivity of a polymer formulated using 50% charged monomer. Another curve shows conductivity of a polymer formulated using a 40% charged monomer. Yet another curve shows conductivity of a polymer formulated using a 25% charged monomer. For these embodiments, it is evident that as electrical potential of up to about 400 volts is applied, up to about 350 microamps can be transported by the polymeric salt bridge.

Figure 5:
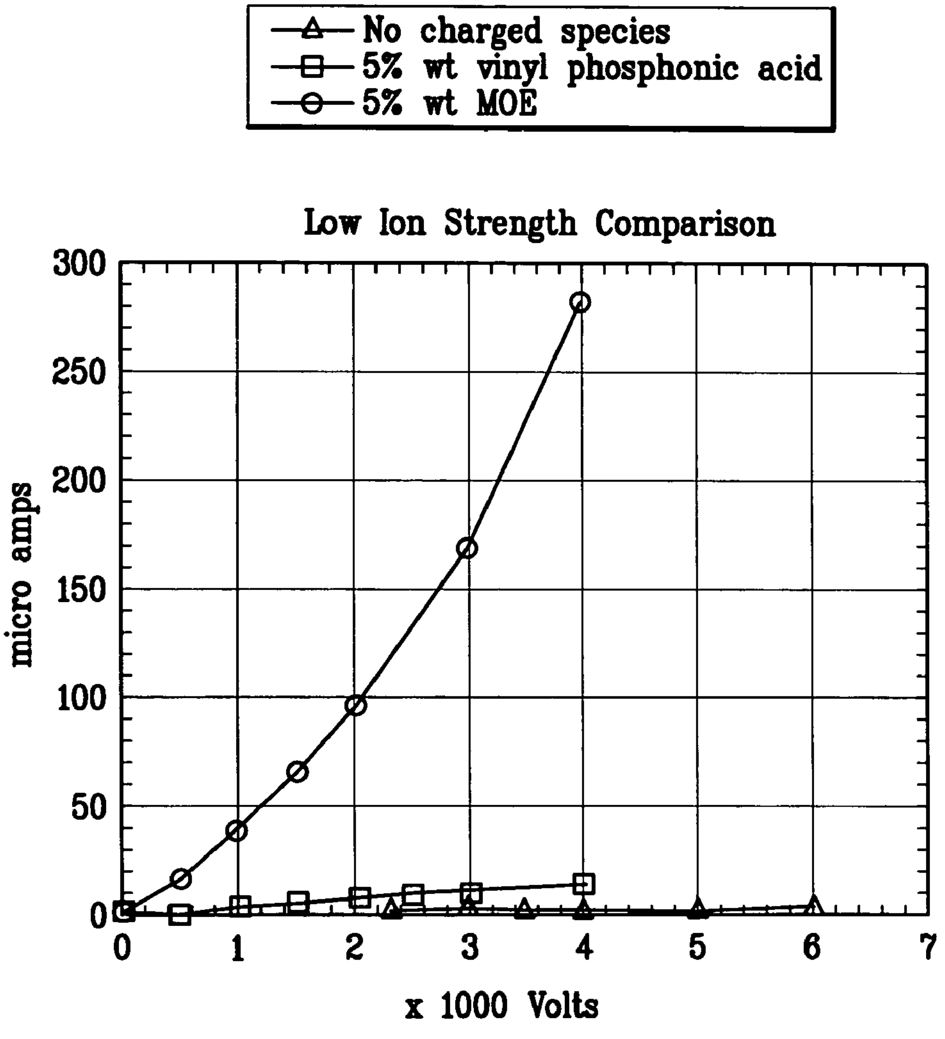
FIG. 5 shows conductivity data as a function of applied voltage for selected polymeric salt bridges fabricated as taught herein, wherein a low ion strength is provided, showing data for (a) salt bridges where no charged species are included, (b) salt bridges where 5% by weight of vinyl phosphonic acid (also known by the abbreviation "VPA") is utilized as the monomer, and (c) salt bridges where 5% by weight of MOE is utilized as the monomer.

In FIG. 5, a comparison of some embodiments having lower ionic strength is provided. In particular, conductivity of a 5% by weight of vinyl phosphonic acid based polymer and a 5% by weight MOE based polymer are depicted. The polymers were cast utilizing a solvent that was 70% acetonitrile, 20% ethanol, and 10% 5 mM Tris buffer solution by volume. The solvent made up a total of 60% of the polymer by mass. The polymer also contained 24% tetra(ethylene glycol) diacrylate cross-linker, 5% charged species, with the remainder of the polymer mass being methacrylonitrile.

Figure 6:
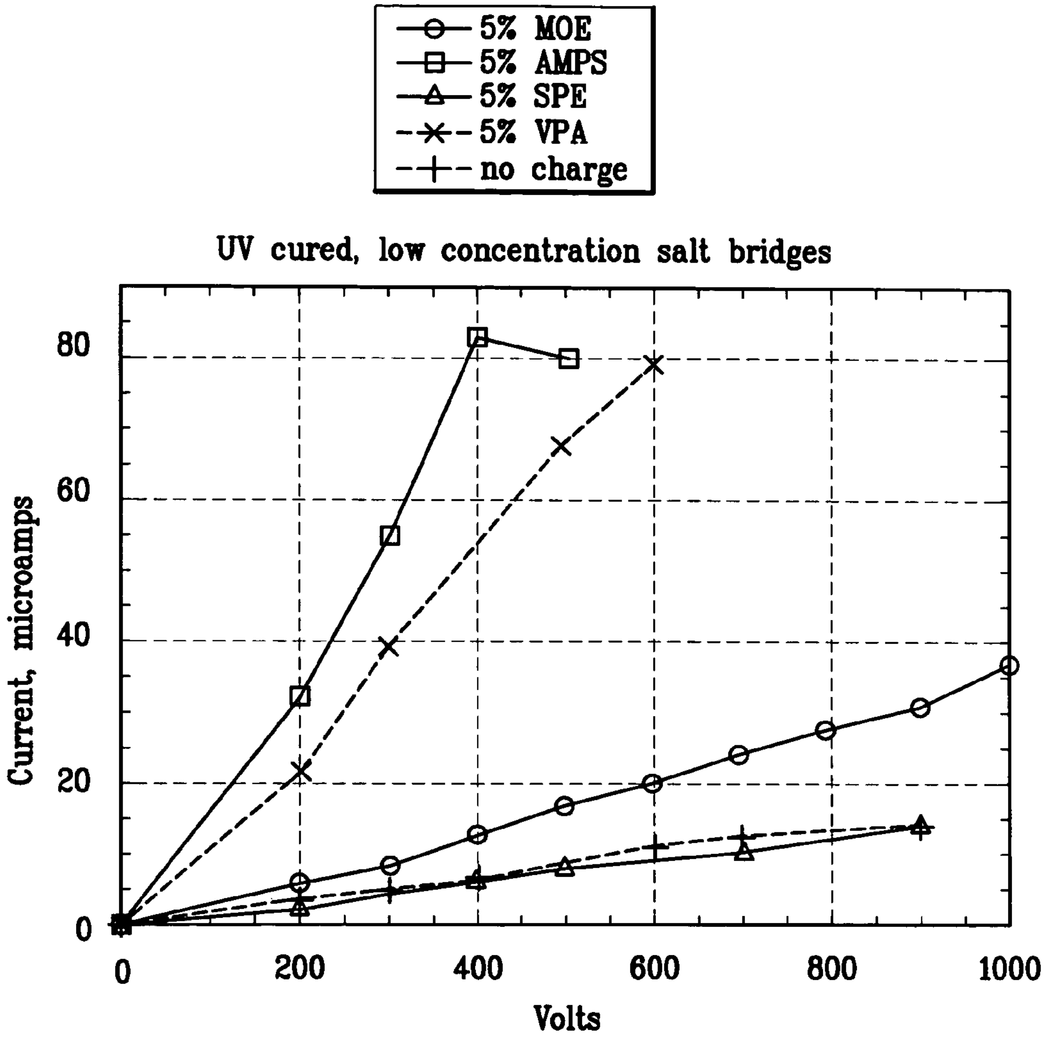
FIG. 6 shows conductivity data as a function of applied voltage for selected low concentration salt bridges fabricated utilizing a UV cure as taught herein, showing data for (a) salt bridges wherein no charge is provided, (b) wherein 5% by weight of MOE is utilized as the monomer, (c) wherein 5% by weight of 2-Acrylamido-2methyl-1-propanesulfonic acid (also known by the abbreviation of "AMPS") is utilized as the monomer, (d) 5% by weight of SPE is utilized as a monomer, and (e) wherein 5% by weight of vinyl phosphonic acid is utilized as the monomer.

Finally, in FIG. 6, a number of conductivity curves are provided for salt bridge embodiments which contain low concentrations of charged species. Each of the formulations for which polymer conductivity is depicted in FIG. 6 utilized a 5 mM Tris buffer at pH 8 as the solvent. The polymers were cured under an ultraviolet light. Acidic monomers (VPA) form more conductive salt bridges in water soluble polymer formulations. In the evaluation shown in FIG. 6, the tests illustrated how effective the various polymers were relative to each other. However, the 0.1 M Tris buffer solution added a significant amount of resistance in the electrical circuit. To more fully evaluate the electrical conductivity, a test was also run using a sample of the best formulation illustrated in FIG. 4, in place of the 0.1 M Tris buffer to connect the microchannel column to the electrode. About 30% more current was supported than when previously utilizing the 0.1 M Tris buffer solution. In any event, FIG. 6 shows conductivity as a function of applied voltage for a polymer formulated (a) using a 5% charged VPA monomer, (b) using a 5% charged SPE monomer, (c) using a 5% charged AMPS monomer, and (d) using a 5% MOE monomer.

Overall, water soluble polymer formulations have the advantage of providing relatively high conductivities yet requiring a minimal number of ingredients. Yet, such formulations have the drawback due to the inconvenience that the MBA cross-linker is only slightly soluble in water. Consequently, in preparing such formulations, it has been found convenient to heat and premix water and MBA for up to about 30 minutes or more to assure that the MBA goes into solution.

Nevertheless, after the MBA cross-linker solution is prepared, it must be cooled to room temperature before any charged monomer (particularly AMPS) and initiator is added, or the solution will immediately thermally polymerize. For water soluble salt bridges, MBA is the cross-linker of choice, so this procedure has been important to achieving the desired results. Further, varying the concentration of MBA utilized provides for varying the mechanical integrity of the resulting polymer. Nonetheless, the actual amounts of MBA cross-linker required for water soluble salt bridge polymer formulations is quite low, from 0% to about 10%. A salt bridge made with AMPS but without any MBA cross-linker is a highly viscous gel, whereas a formulation made with only about 1% MBA cross-linker is a firm rubbery material. And although up to as much as 10% MBA cross-linker may be utilized, it has been found that MBA cross-linker concentrations greater than about 3% exacerbate the solubility problems of MBA in water without significantly increasing the structural integrity of the manufactured polymeric salt bridge.

In the water based formulations, vinyl phosphonic acid (VPA) monomer or styrene sulfonic acid sodium hydrate monomer can be substituted for AMPS monomer. Such alternate formulations generally result in electrical conductivities that are somewhat less than is achieved using AMPS monomer in the formulation. MOE monomer can also be utilized in the water soluble formulations when a mobile anion is desired rather than a mobile cation.

In both organic based salt bridge formulations and water based salt bridge formulations, ionic strength may need to be reduced when the salt bridges are used in conjunction with sensitive analytical procedures. In the case of organic based formulations, methacrylonitrile can be substituted for at least some of the MOE. Methacrylonitrile does not release any ions in solution, and does not contribute to the conductivity of the polymer. In the case of water based formulations, 2-hydroxyethyl methacrylate can be utilized for the same purpose. Referring back to FIGS. 3 and 4, it can be seen that for various cases, the concentration of charged species can be reduced without proportionately reducing conductivity.

In summary, various embodiments have been described with respect to the manufacture and use of a cast-in-place polymeric salt bridge for providing ionic current flow in microchannel systems. The salt bridges described herein can easily be manufactured by the application of lithographic methods to monomer mixtures formulated in such a way that the resulting polymeric element can be bonded to the microchannel walls, and so that the polymeric element retains structural integrity upon exposure to a variety of solvents. Such salt bridges can retain an effective seal against pressures greater than 6000 pounds per square inch, and thus are suitable for high pressure pumping techniques such as electrokinetic or high pressure liquid chromatography pumps.

It is to be appreciated that the various aspects and embodiments for polymeric salt bridges, and for methods of construction thereof especially as may be applied for use in completing electrical circuits in microfluidic devices, is an important improvement in the state of the art of manufacture and use of such devices. Although only a few exemplary embodiments have been described in detail, various details are sufficiently set forth in the drawings, the tables, and in the specification provided herein to enable one of ordinary skill in the art to make and use the invention(s), which need not be further described by additional writing in this detailed description. Importantly, the aspects and embodiments described and shown herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive. This disclosure is intended to cover the structures and compositions described herein and not only structural equivalents thereof, but also equivalent structures. Numerous modifications and variations are possible in light of the above teachings. It is therefore to be understood that the invention(s) may be practiced otherwise than as specifically described herein. Thus, the scope of the invention(s), as set forth in the following claims, as well as in the drawings and by the foregoing description, is intended to include variations from the embodiments provided which are nevertheless described by the broad interpretation and range of equivalents properly afforded to the plain meaning of the language of the claims provided herein.

TABLE 1

| STRUCTURE | X | R | CHEMICAL NAME | NICKNAME |
|---|---|---|---|---|
| 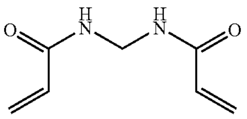 | | | Methylene bisacrylamide | MBA |
| | X | R | | |
| 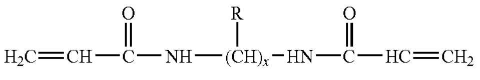 | 1 | H | N,N'-Methylenebisacrylamide | |
| | 1 | H | N,N'-Methylenebisacrylamide | |
| | 2 | OH | N,N'-(1,2-Dihydroxyethylene)bisacrylamide | |
| STRUCTURE | | | CHEMICAL NAME | NICKNAME |
| 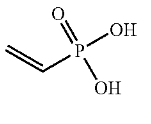 | | | Vinyl phosphonic acid | VPA |

TABLE 1-continued

| | | |
|---|---|---|
| 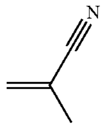 | Methacrylonitrile | MA |
| 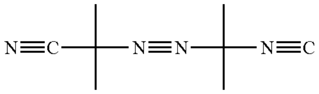 | 2,2' Azobisisobutronitrile | AIBN |
| 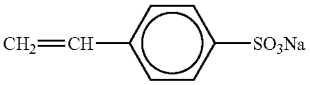 | Sodium p-styrene sulfonate | SSS |
| 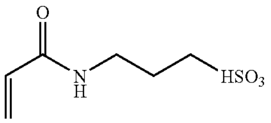 | 2-Acrylamido-2-methyl-1-propane sulfonic acid | AMPS |
| 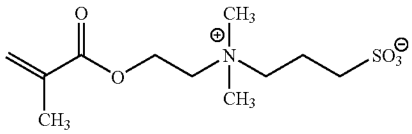 | N,N-Dimethyl-N-(2-methacryloyloxyethyl)-N-(3-sulfopropyl) ammonium betaine | SPE |
| 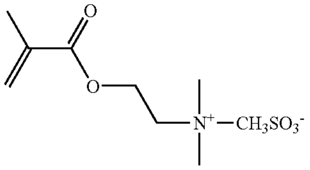 | [2-(Methacryloyloxy)ethyl] trimethyl ammonium methyl sulfate | MOE |
| 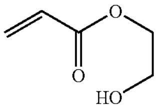 | 2-Hydroxyethyl acrylate | HEA |
| 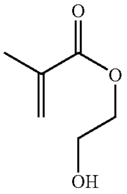 | 2-Hydroxyethyl methacrylate | 2-HEMA |
| 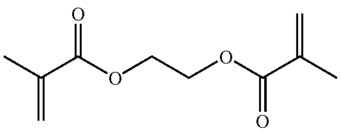 | Ethylene glycol dimethacrylate | EDA |

| | Derivatives of methylenebisacrylamide | | | |
|---|---|---|---|---|
| | X | R | | |
| 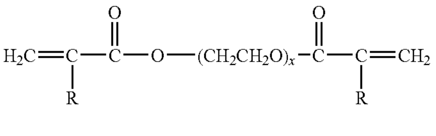 | 1 | H | Ethylene glycol diacrylate | EDA |
| | 2 | H | Di(ethylene glycol) diacrylate | DEDA |
| | 4 | H | Tetra(ethylene glycol) diacrylate | TEGDA |
| | 1 | $CH_3$ | Ethylene glycol dimethacrylate | |
| | 2 | $CH_3$ | Di(ethylene glycol) dimethacrylate | |
| | 3 | $CH_3$ | Tri(ethylene glycol) dimethacrylate | |

TABLE 1-continued

| STRUCTURE | CHEMICAL NAME | NICKNAME |
|---|---|---|
| 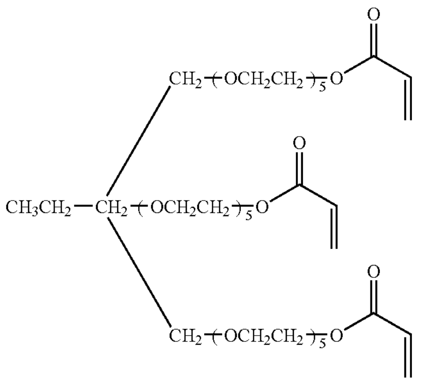 | ethoxylated (15) trimethylolpropane triacrylate | SR-9035 |

We claim:

1. A microfluidic device, said device comprising:

a body, said body comprising a plurality of chambers adapted for storing a fluid material therein;

a plurality of microchannels having interior fluid containing walls for fluidly interconnecting at least some of said chambers to allow said fluid material to flow therebetween via at least some of said microchannels;

a polymeric salt bridge, said polymeric salt bridge comprising a monolithic microporous polymer, said polymeric salt bridge formed in situ in a portion of a selected one of said plurality of microchannels so as to substantially block bulk flow of said fluid material therethrough wherein said polymeric salt bridge is formulated using a selected first monomer, a selected first cross-linker, wherein the first cross-linker is ethoxylated (15) trimethylolpropane triacrylate and wherein said first cross-linker is selected to provide a desired structural quality, a selected solvent and a selected initiator, and wherein said first monomer and said cross-linker are selected to define a selected degree of porosity and at least a preselected ionic conductivity at a preselected voltage potential;

said polymeric salt bridge having a first end and a second end along said selected one of said plurality of microchannels, said polymeric salt bridge adapted to conduct electricity by way of migration of ions between said first and said second end when a voltage potential is placed therebetween.

2. The microfluidic device as set forth in claim 1, wherein said polymeric salt bridge is formulated additionally using at least a selected second monomer.

3. The microfluidic device as set forth in claim 1, wherein said polymeric salt bridge is formulated additionally using at least a selected second cross-linker.

4. The microfluidic device as set forth in claim 1, wherein said desired structural quality comprises porosity.

5. The microfluidic device as set forth in claim 1, wherein said desired structural quality comprises hardness.

6. The microfluidic device as set forth in claim 1, wherein said desired structural quality comprises flexibility.

* * * * *